United States Patent [19]

Bühler et al.

[11] 4,086,521

[45] Apr. 25, 1978

[54] DIGITAL SYSTEM FOR STABILIZING THE SPEED OF A CLOCKWORK MOTOR

[75] Inventors: Roger Bühler, Le Locle, Switzerland; Christian Faivre, Morteau, France

[73] Assignee: Les Fabriques d'Assortiments Reunies, Le Locle, Switzerland

[21] Appl. No.: 686,524

[22] Filed: May 14, 1976

[30] Foreign Application Priority Data

May 16, 1975 Switzerland ........................ 6376/75

[51] Int. Cl.$^2$ ........................... G05B 5/00; H02P 5/00

[52] U.S. Cl. .................................... 318/307; 318/314; 318/318; 318/341

[58] Field of Search ................ 318/307, 314, 318, 341

[56] References Cited

U.S. PATENT DOCUMENTS

| | | | |
|---|---|---|---|
| 3,110,853 | 11/1963 | Jones | 318/314 |
| 3,206,665 | 9/1965 | Burlingham | 318/314 |
| 3,546,553 | 12/1970 | Loyd | 318/341 |
| 3,564,368 | 2/1971 | Kelling | 318/341 |
| 3,621,354 | 11/1971 | Fawcett et al. | 318/341 |
| 3,646,417 | 2/1972 | Cassie et al. | 318/318 |

*Primary Examiner*—Robert K. Schaefer
*Assistant Examiner*—Eugene S. Indyk
*Attorney, Agent, or Firm*—Karl F. Ross

[57] ABSTRACT

An energizing circuit for an electric motor, driving a clockwork of a timepiece, includes a stator coil coacting with one or more magnet pairs on an associated rotor whose periodic alignment with the coil induces therein a train of monitoring pulses with a frequency proportional to the motor speed. The monitoring pulses are amplified and fed back to the coil, as driving pulses, through a coincidence gate which is opened or closed under the control of a speed-sensing network including a crystal-controlled oscillator whose output wave, stepped down in a frequency divider, is a series of timing pulses fed to a pulse counter which is reset by the monitoring pulses and whose count, therefore, varies inversely with the motor speed. Through a logic circuit and a pair of cascaded flip-flops, the transmission of driving pulses to the coil is inhibited when the count falls short of a lower limit — indicative of excessive motor speed — but is allowed to proceed when the count surpasses an upper limit representing an insufficiently low speed. In the range between these two limits, the counter blocks or unblocks the transmission of a driving pulse in dependence upon the relative phasing of the monitoring pulses from the motor and a sequence of reference pulses of fixed cadence, equal to a fraction of the timing-pulse frequency, derived from the frequency divider. The monitoring pulses and the reference pulses are supplied through an anticoincidence network, including a pair of binary memories, to a reversible pulse counter delivering a phasing signal to the logic circuit.

10 Claims, 3 Drawing Figures

DIGITAL SYSTEM FOR STABILIZING THE SPEED OF A CLOCKWORK MOTOR

FIELD OF THE INVENTION

Our present invention relates to a system for stabilizing the speed of a motor driving a load, more particularly a clockwork of a timepiece.

BACKGROUND OF THE INVENTION

In such a system it is known, e.g. from U.S. Pat. No. 3,110,853, to provide a reversible counter which is stepped in one sense (e.g. additively) by reference pulses of fixed frequency and in the opposite sense (e.g. subtractively) by monitoring pulses which are generated in predetermined angular positions of the motor shaft and whose cadence is therefore proportional to the actual motor speed. The term "actual motor speed" is here used to distinguish from the rated speed of the motor which is represented by the recurrence frequency or cadence of the reference pulses and from which the actual speed should deviate as little as possible. A coarse control of the motor speed is carried out with the aid of analog signal derived from a frequency comparator directly receiving the two pulse trains; a fine control is achieved, for actual motor speeds close to the rated speed, through a decoder which converts the reading of the reversible counter into a phasing signal in analog form indicative of either a positive or a negative count. The aforementioned patent also describes an anticoincidence circuit designed to prevent counting errors due to the overlapping of pulses appearing more or less simultaneously at the additive and subtractive inputs of the counter.

The coarse speed control based on frequency differences of the two pulse trains often leads to overcorrection, causing the system to hunt about the rated speed value between limits depending on the sensitivity of the frequency comparator. Because of the generally low power of resolution of such frequency comparators, the speed excursions occur within a wide range.

OBJECTS OF THE INVENTION

The general object of our present invention, therefore, is to provide an improved speed-stabilizing system which effectively limits the deviations of the motor speed from its rated value.

A more particular object is to provide, in such a system, an anticoincidence circuit which maintains a predetermined minimum separation between two sets of pulses fed to an additive and a subtractive input of a reversible counter and derived from two pulse trains of random relative phase.

SUMMARY OF THE INVENTION

In accordance with our present invention, a generator of fixed-frequency reference pulses, as discussed above, also produces a series of timing pulses at a cadence equaling a predetermined multiple of the reference-pulse frequency, these timing pulses being fed to a pulse counter which has a resetting input connected to a source of monitoring pulses coupled with the motor whose speed is to be stabilized. The monitoring and reference pulses are also supplied to phase-comparison means, which may comprise a reversible pulse counter different from the counter for the timing pulses, emitting a first phasing signal whenever the monitoring pulses recur at a rate higher than that of the reference pulses and emitting a second phasing signal in the opposite case. The timing-pulse counter, periodically reset by the monitoring pulses, produces a reading indicative of the magnitude of the actual motor speed relative to a range centered on the rated speed. This counter controls the delivery of recurrent driving pulses from a supply circuit to the energizing circuit of the motor for accelerating same, the transmission of these driving pulses being inhibited whenever the motor speed is too high. Thus, a logic network connected to the timing-pulse counter suppresses the driving pulses as long as the reading of that counter corresponds to motor speeds above the upper range limit and lets the driving pulses pass with motor speeds less than the lower range limit; between these range limits, the logic network blocks the delivery of the driving pulses in the presence of the first phasing signal and unblocks it in the presence of the second phasing signal.

Within the power of resolution of the timing-pulse counter, determined by the frequency of the timing pulses, the upper and lower limits of the speed range may be brought together as closely as desired in order to enhance the stability of the motor speed.

Pursuant to another feature of our invention, an anticoincidence circuit forming part of the phase-comparison means includes storage means controlled by the timing pulses for delaying any monitoring pulse, occurring during a predetermined interval bridging a reference pulse, beyond that interval. The storage means may comprise a pair of binary memories each formed, for example, by two NOR gates in cascade; the input of one memory includes a coincidence gate receiving the monitoring pulses and a pulse sequence synthesized from the timing and reference pulses, the input of the other memory including a summing gate to which the output pulses of the first memory are applied together with the monitoring pulses. The timing and reference pulses can be respectively obtained from an upstream stage output and a downstream stage output of a frequency divider driven by a square-wave oscillator; a pulse shaper converts the voltage of the downstream stage output into a reference pulse coinciding with every $n^{th}$ timing pulse where $n$ is an integer greater than 2. An NOR gate receiving the timing and reference pulses will then produce the aforementioned pulse sequence in the form of a square wave which is in step with the timing pulses but inverted relatively thereto and which has a $1\frac{1}{2}$-cycle gap centered on each reference pulse to establish a lockout interval.

The two binary memories may have cancellation inputs connected to the last-mentioned NOR gate by way of respective differentiation circuits for clearing these memories at instants separated by a half-cycle of the synthesized pulse sequence, e.g. on the leading and on the trailing edge of a pulse of that sequence immediately following its gap.

In a particularly advantageous embodiment more fully described hereinafter, the energizing circuit of the motor includes at least one coil coacting with one or more pairs of permanent magnets rotatable relatively thereto whereby one or more pulses are induced in that coil during each revolution. The driving pulses for the motor are derived from these induced pulses and are fed back to the coil in a loop provided with the necessary amplifying means, the loop including a gate connected to the logic network which selectively blocks and unblocks the driving pulses under the control of the timing-pulse counter and the reversible counter of the phase-comparison means. A lead connected to the feedback path upstream of that gate serves as the source of the monitoring pulses fed to the speed-sensing network.

BRIEF DESCRIPTION OF THE DRAWING

The above and other features of our invention will now be described in detail with reference to the accompanying drawing in which.

SPECIFIC DESCRIPTION

Figure 1:
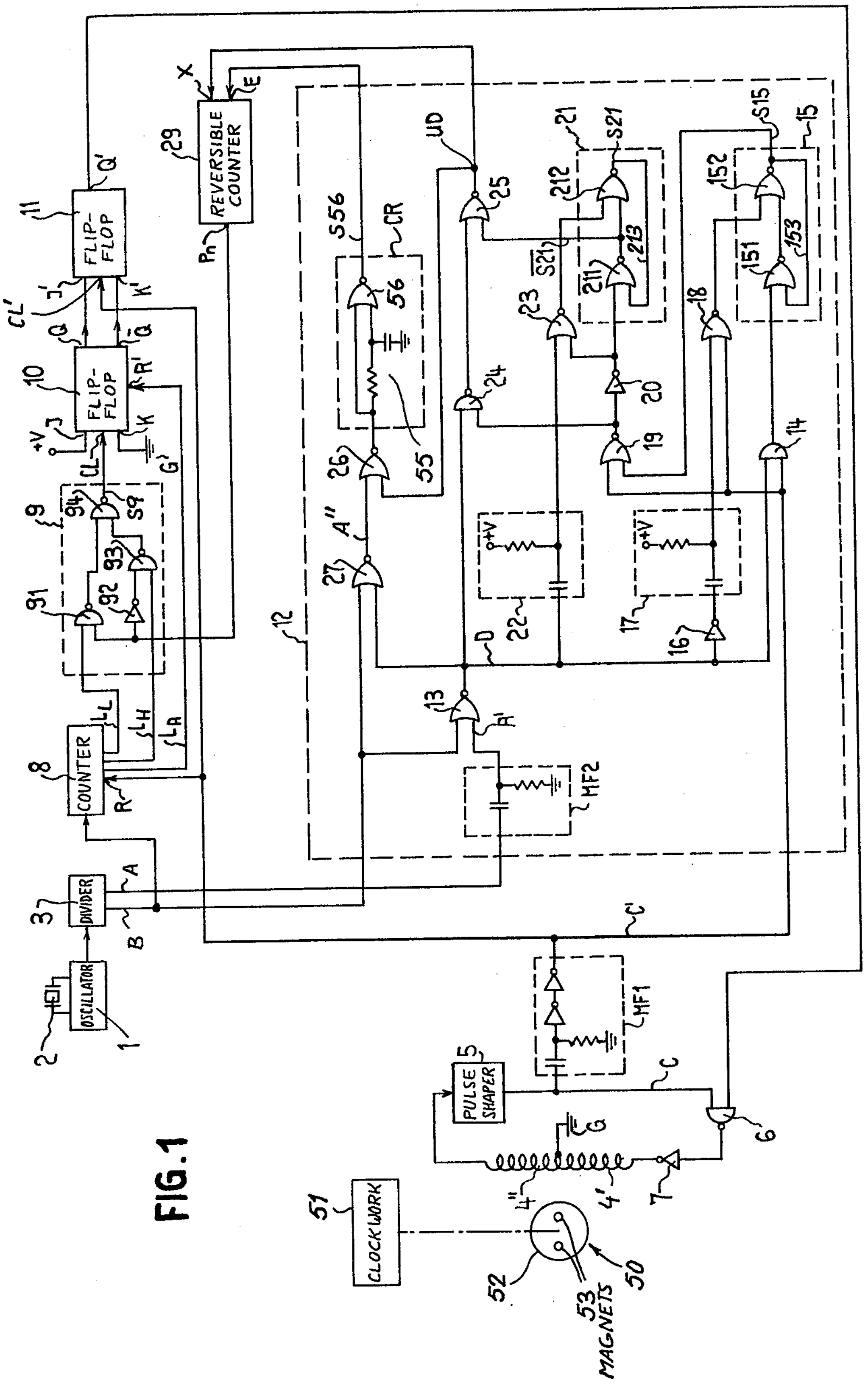
FIG. 1 is a circuit diagram of a speed-stabilizing system embodying our invention.

In FIG. 1 we have shown a speed-stabilizing system for a motor 50 driving a clockwork 51 of a timepiece not further illustrated. Motor 50, which is of conventional construction and has been illustrated only schematically, comprises a rotor 52 carrying permanent magnets 53 which coact with a stator coil split into two halves 4', 4'' whose junction is grounded at G. The magnets 53 are usually provided in pairs and, when passing the coil section 4'', induce therein a succession of pulses that are transformed in a shaping circuit 5 into driving pulses C designed to accelerate the rotor 52 upon being fed back, in suitably amplified form, to coil section 4' to repel the magnets moving past the latter. The loop returning the pulses C to coil section 4' includes a NAND gate 6 also acting as an amplifier, this gate being followed by an inverter 7; from a purely logical viewpoint, the combination of elements 6 and 7 may be considered a simple AND gate selectively inhibiting the transmission of pulses C. It will therefore be convenient to refer to the gate 6 as "closed" when it conducts and as "open" when it does not (i.e. when both its inputs are energized). In the present instance, the magnets 53 are assumed to be arranged in two pairs generating a pulse C during every half-turn of rotor 52. The two coil halves 4' and 4'' could, of course, also be considered as two mutually independent windings.

Figure 2:
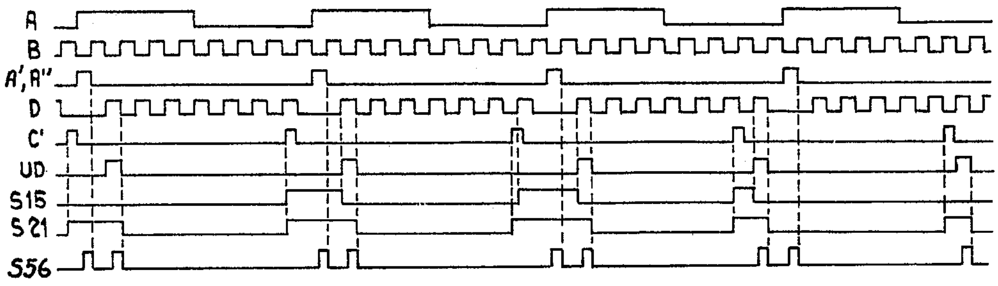
FIG. 2 is a set of graphs serving to explain the operation of the system in FIG. 1.

The feedback path carrying pulses C to gate 6 has a branch lead, downstream of pulse shaper 5, which includes another pulse-shaping circuit MF1 (essentially a differentiation network) serving to sharpen these relatively broad driving pulses into narrow monitoring pulses C' illustrated in FIG. 2. The recurrence frequency or cadence of monitoring pulses C' is, of course, proportional to the motor speed and is therefore subject to random variations.

A square-wave oscillator 1, controlled by a crystal 2, forms part of a speed-sensing network and works into a frequency divider 3 with a downstream stage output and an upstream stage output carrying respective square waves A and B as also illustrated in FIG. 2. Square wave B, in this embodiment, has a fixed frequency eight times that of square wave A and constitutes a train of timing pulses fed to a stepping input of a binary pulse counter 8 which has a resetting input R receiving the monitoring pulses C' from circuit MF1. Speed-sensing counter 8 has three stage outputs delivering respective binary signals $L_A$, $L_H$ and $L_L$. Signal $L_A$ is a short pulse appearing on a count of "1", thus after the counter has taken one step following resetting to zero by a pulse C'. Signals $L_H$ and $L_L$ respectively mark the upper and the lower limit of a speed range centered on a rated motor speed which in determined by the fixed frequency of square wave A, i.e. a speed at which a monitoring pulse C' comes into existence once per cycle of wave A and thus with every eighth cycle of wave B. In the present instance it is assumed that signals $L_H$ and $L_L$ are generated on decimal counts of "6" and "10", respectively; signals $L_H$ and $L_L$ remain in existence also with count readings higher than their respective thresholds whereby speeds less than the aforementioned lower range limit are characterized by the simultaneous presence of both signals $L_H$ and $L_L$.

Pulse counter 8 works into a logic network 9 comprising three NAND gates 91, 93 and 94 as well as an inverter 92. A reversible counter 29, whose operation will be described in detail hereinafter, emits a binary phasing signal $P_n$ which has the logical value "1" when the mean motor speed is higher and the logical value "0" when that mean motor speed is lower than the rated speed. Signal $P_n$ is fed directly to an input of NAND gate 91 and via inverter 92 to an input of NAND gate 93; other inputs of gates 91 and 93 receive, respectively, the signal $L_L$ and the signal $L_H$ from counter 8. The two NAND gates 91 and 93 work into respective inputs of NAND gate 94 whose output is a setting pulse 89 fed to a switching input CL of a flip-flop 10 which has a resetting input R' connected to the first stage output of counter 8 carrying the signal $L_A$. Data inputs J and K of flip-flop 10 are respectively connected to positive voltage +V and to ground G. Another flip-flop 11 has data inputs J' and K' respectively connected to set and reset outputs Q and $\overline{Q}$ of flip-flop 10 in cascade therewith. A switching input CL' of flip-flop 11 receives the monitoring pulses C' from circuit MF1; a set output Q' of flip-flop 11 is tied to an input of NAND gate 6 whose other input receives the driving pulses C fed back from pulse shaper 5.

Thus, the presence of a setting pulse S9 in the output of logic network 9, following the disappearance of a resetting pulse $L_A$ in the output of counter 8, energizes the set output Q of flip-flop 10 and thus causes a setting of flip-flop 11 by the next monitoring pulse C', i.e. concurrently with a zeroizing of counter 8. The resulting energization of output Q' of flip-flop 11 opens the gate 6 for the passage of the driving pulses C to accelerate the motor 50.

The conditions under which such acceleration takes place will be apparent from the following truth table:

| $L_L$ | $L_H$ | $P_n$ | S9 |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 1 | 0 | 1 |
| 1 | 1 | 1 | 1 |

The first two rows of the foregoing truth table reflect motor speeds exceeding the upper range limit, with $L_L = L_H = S9 = 0$. Gate 6 remains closed and the transmission of driving pulses to coil section 4' is blocked irrespectively of the value of phasing signal $P_n$.

The two bottom rows of the table relate to the case where the motor speed is less than the lower range limit, with $L_L = L_H = S9 = 1$. Gate 6 is now open and passes the pulses C to accelerate the motor, again irrespectively of the value of phasing signal $P_n$.

The two middle rows of the truth table represent the situation in which, as desired, the actual motor speed falls within the established range and thus lies close to the rated speed determined by the reference-pulse generator 1 - 3. With $L_L \neq L_H$, we find that $S9 = \overline{P_n}$ so that the driving pulses are suppressed with motor speeds above the rated value and are given passage with motor speeds below that value. This constitutes a fine or vernier adjustment of the speed within the range established by pulse counter 8 which in turn can be made as narrow as desired, to an extent compatible with the frequency ratio of square waves A and B.

Reversible counter 29 is controlled by an anticoincidence circuit 12 receiving pulse trains A, B and C' from divider 3 and pulse shaper MF1. Square wave A is fed within circuit 12 to a further pulse shaper MF2, again in the form of a differentiation network, which reduces the width of its pulses to that of a half-cycle of square wave B. The resulting pulses A', illustrated in FIG. 2, will be seen to coincide with spaces between timing pulses B, both pulse trains B and A' being fed to a NOR gate 13 synthesizing from them a pulse sequence $D = \overline{A'+B}$. As will be apparent from FIG. 2, this pulse sequence is basically a square wave of the same cadence as wave B but inverted with reference thereto, its pulses being interrupted by a gap of 1½ cycles centered on the occurrence of a pulse A'. This gap constitutes a lockout interval periodically established by pulse-sequence synthesizer MF2, 13.

A binary memory 15 in circuit 12 consists of two cascaded NOR gates 151 and 152 with a feedback connection 153 which cuts off the normal output of gate 151 whenever gate 152 generates an output signal S15. An AND gate 14, receiving the pulse trains C' and D, works into an input of NOR gate 151 to set the memory 15 whose output signal S15 thereupon energizes an input of another NOR gate 19 also receiving the pulses C'. NOR gate 19 works, through an inverter 20, into a first-stage NOR gate 211 of another binary memory 21, similar to memory 15, whose second-stage NOR gate 212 has a feedback connection 213 extending to gate 211. Memory 15 is resettable by the output of a NOR gate 18 working into its second-stage NOR gate 152; gate 18 receives on one input the pulses C' and on another input a series of sharp spikes derived by a differentiation network 17, preceded by an inverter 16, from the leading edges of the pulses D. Another differentiation network 22, receiving the noninverted pulses D, feeds a NOR gate 23 also connected to the output ot inverter 20. NOR gate 23, serving to reset the memory 21 by energizing an input of its gate 212, obtains from network 22 a set of sharp spikes coinciding with the trailing edges of pulses D. NOR gate 211 of memory 21 feeds the complement $\overline{S21}$ of an output signal S21 to a NOR gate 25 also having an input connected to an output of a NAND gate 24; the latter has inputs respectively connected to the outputs of NOR gates 13 and 19. Networks 17 and 22 have shunt resistors connected to positive voltage +V whereby the NOR gates 18 and 23 are normally cut off.

The output signal S15 of memory 15 comes into existence, as shown in FIG. 2, whenever there is at least a partial coincidence between pulses C' and D resulting in the conduction of AND gate 14. The output signal S21, as likewise shown in FIG. 2, starts concurrently with every pulse C' whether or not the same is accompanied (with greater or less overlap) by a signal S15. NOR gate 19 remains cut off from the leading edge of a pulse C' to the trailing edge of that pulse or of a pulse S15 generated thereby; this causes conduction of NAND gate 24 and a resulting cutoff of NOR gate 25. Since NOR gate 25 is also cut off in the absence of pulses D fed to NAND gate 24, a pulse UD appears in the output of NOR gate 25 simultaneously with the occurrence of the first pulse D following the disappearance of either a pulse C' or a pulse $\overline{S15}$, provided that memory 21 has been set so that $\overline{S21}$ in the input of NOR gate 25 is at zero. Thus, as shown in FIG. 2, a monitoring pulse C' falling into a gap of pulse sequence D or occurring shortly before that gap (so as to coincide at least partly with the immediately preceding pulse D) will give rise to an output pulse UD only after the gap has passed; in other instances the pulses UD follow the pulses C' more closely but never coincide with them.

A pulse-shortening network CR, including an integrating circuit 55 and a NOR gate 56, is connected to the output of a NOR gate 26 which receives the pulses UD on one of its inputs. Another NOR gate 27 receives the pulses B and D so that its output, connected to another input of NOR gate 26, carries a series of pulses $A'' = \overline{B}A'$ substantially corresponding to the pulses A' in the input of gate 13 (though pulses A' could be a little wider). Since the pulses A'' invariabley fall into a gap of pulse sequence D, they can never coincide with or overlap any of the pulses UD; thus, the normally conducting NOR gate 26 is cut off at different times by reference pulses A'' and pulses UD representing a delayed replica of monitoring pulses C'. In response to a pulse A'' or UD in the input of NOR gate 26, NOR gate 56 produces a narrower output pulse S56 whose leading edge lags that of the input pulse by an interval depending on the time constant of integrating network 55. Pulses S56, also shown in FIG. 2, are fed to a stepping input E of reversible counter 29; a discriminating input X of this counter is tied to the output of NOR gate 25 in order to receive the undistorted pulses UD therefrom. The energization of discriminating input X by a pulse UD, occurring slightly before the arrival of the narrower pulse S56 derived therefrom, sets the counter 29 in an additive mode so as to increase its count in response to each monitoring pulse C' converted into its delayed replica UD. When a reference pulse A'' arrives at gate 26, the resulting output S56 fed to counter input E is not accompanied by a pulse UD on input X so that the counter 29 is switched into a subtractive mode and reduces its count.

Over the long run, therefore, the reading of counter 29 will be positive (or above a preset reference count) if the motor speed exceeds its rated value, i.e. if the pulses C, C', UD occur more frequently than the pulses A, A', A'' of fixed frequency, whereby $P_n = 1$; with motor speeds below that threshold, the reading will be negative (or below the preset count) and $P_n = 0$.

Let us assume, by way of example, that the rated speed of motor 50 is eight revolutions per second, corresponding to a cadence of 16 Hz for reference pulses A', A'' derived from square wave A. The frequency of square wave B will then equal 128 Hz. Suppose, now, that the motor runs too fast so that counter 8 is reset by a monitoring pulse C' after the appearance of only five timing pulses B in its stepping input. This means that neither signal $L_H$, $L_L$ is generated and S9 = 0 according to the foregoing truth table, gate 6 remaining closed. Since the rotor 52 does not experience any acceleration, it will slow down and eventually reach the speed corresponding to the upper range limit, with monitoring pulses C' recurring every six timing pulses B. If the average motor speed over the preceding cycles has been above normal, i.e. if the reading of counter 29 is still positive, the transmission of driving pulses to coil section 4' will continue to be inhibited until the deceleration has reached the lower range limit corresponding, in the present example, to ten timing pulses B per cycle of monitoring pulses C'. Now the simultaneous appearance of signals $L_H$ and $L_L$ switches the flip-flop 11, as described above, and opens the gate 6 so that the driving pulses C can accelerate the motor and reduce the number of timing pulses B between resettings of counter 8.

At this point the counter 29 may still have a positive reading ($P_n = 1$) so that acceleration stops as soon as the motor speed gets back into its range. Since this will again cause a slowdown, the motor speed will now hover around the lower range limit until the contents of counter 29 have been sufficiently depleted to make the binary phasing signal $P_n$ equal to zero. Gate 6 then remains open until signal $P_n$ again has its finite value "1" or until the motor speed returns to the upper range limit, whichever occurs first. The stabilization process then continues in the aforedescribed manner.

Figure 3:
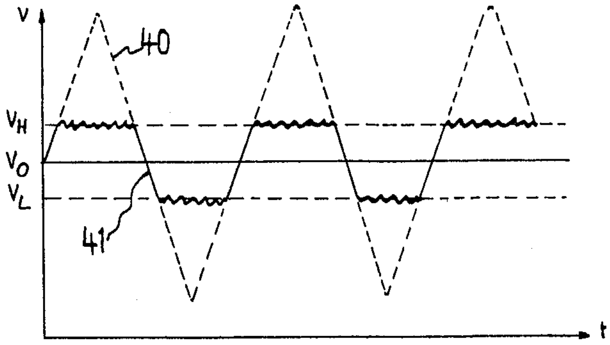
FIG. 3 is a curve diagram illustrating the control of the motor speed by that system.

Reference in this connection is made to FIG. 3 showing the motor speed V plotted against time *t*, the rated speed $V_0$ lying midway between a lower range limit $V_L$ and a higher range limit $V_H$. A dotted line 40 represents the hunting that would occur with conventional motor-control systems of the type discussed under the heading "Background of the Invention". A solid line 41 represents the actual motor speed as stabilized by our present system under the conditions just discussed. It will be apparent that this speed 41 need not necessarily reach the limits $V_H$ or $V_L$ but can also fluctuate about the median level $V_0$, under the exclusive control of reversible counter 29.

At least some of the components of the system shown in FIG. 1, including the resistors and capacitors of its differentiating and integrating networks, can be realized in modular form with integrated circuitry. Naturally, the frequencies and pulse counts given by way of example can be changed according to the requirements of the timepiece to be driven by the controlled motor.

We claim:

1. A speed-stabilizing system for a motor driving a load, comprising:

an energizing circuit for said motor;

a source of monitoring pulses coupled with said motor, said monitoring pulses having a cadence proportional to the actual motor speed;

a generator of reference pulses of fixed frequency corresponding to a preselected motor speed in a range between a predetermined lower speed limit and a predetermined higher speed limit, said generator further producing a series of timing pulses at a cadence equaling a predetermined multiple of said fixed frequency;

phase-comparison means connected to said source and to said generator for emitting a first phasing signal upon said monitoring pulses recurring at a rate higher than that of said reference pulses and emitting a second phasing signal upon said monitoring pulses recurring at a rate lower than that of said reference pulses;

pulse-counting means connected to said generator for stepping by said timing pulses and connected to said source for resetting by said monitoring pulses, said pulse-counting means producing a reading indicative of the magnitude of the actual motor speed relative to said range;

supply means for delivering recurrent driving pulses to said energizing circuit for accelerating the motor;

inhibiting means in series with said energizing circuit for selectively blocking passage of said driving pulses; and logical circuitry connected to said inhibiting means and jointly controlled by said pulse-counting means and said phase-comparison means for suppressing said driving pulses in response to a reading corresponding to motor speeds above said upper limit and in the presence of said first phasing signal in response to a reading corresponding to motor speeds within said range, said logical circuitry allowing delivery of said driving pulses in response to a reading corresponding to motor speeds below said lower limit and in the presence of said second phasing signal in response to a reading corresponding to motor speeds within said range.

2. A system as defined in claim 1 wherein said phase-comparison means comprises a reversible counter steppable in opposite directions by said monitoring and reference pulses.

3. A system as defined in claim 2 wherein said phase-comparison means further comprises an anticoincidence circuit including pulse-forming means connected to said generator for establishing a series of lockout intervals each starting before and ending after a respective reference pulse, said anticoincidence circuit further including storage means connected to said pulse-forming means for delaying any monitoring pulses for the duration of any simultaneously occurring lockout interval.

4. A system as defined in claim 3 wherein said pulse-forming means comprises a synthesizing network producing a pulse sequence derived from said timing and reference pulses, said storage means comprising a first binary memory with an input including a coincidence gate connected to said source and to said synthesizing network for receiving said monitoring pulses and said pulse sequence therefrom, and a second binary memory with an input including a logical summing gate connected to said source and to an output of said first binary memory.

5. A system as defined in claim 4 wherein said generator comprises a square-wave oscillator and a frequency divider connected to said oscillator, said frequency divider having an upstream stage output producing said timing pulses and a downstream stage output provided with a pulse shaper for producing a reference pulse coinciding with every $n^{th}$ timing pulse where $n$ is an integer greater than 2, said stage outputs being connected to the inputs of said binary memories through a NOR gate whereby said synthesized pulse sequence is a square wave in step with said timing pulses but inverted relatively thereto with a gap centered on each reference pulse.

6. A system as defined in claim 5 wherein each of said binary memories has a cancellation input connected to said NOR gate by way of a respective differentiation circuit for clearing said binary memories at instants separated by a half-cycle of said synthesized pulse sequence.

7. A system as defined in claim 1 wherein the motor includes coil means connected to said energizing circuit and magnet means rotatable relatively thereto whereby a pulse is induced at least once per revolution in said coil means, said supply means including a feedback path of said energizing circuit provided with amplifying means for converting the induced pulses into said driving pulses for the motor, said feedback path forming a loop including said inhibiting means, said source comprising a branch lead connected so said feedback path ahead of said inhibiting means.

8. A system as defined in claim 7 wherein said pulse-counting means has a first output energized by a predetermined count representing said upper limit and a second output energized by a predetermined count representing said lower limit, said logical circuitry including a pair of coincidence gates with inputs respectively connected to said first and second outputs and with other inputs connected to said phase-comparison means, one of said other inputs including an inverter.

9. A system as defined in claim 8 wherein said pulse-counting means has a third output energized by a predetermined count lower than the one representing said upper limit, said logical circuitry further including a first and a second flip-flop in cascade with each other, said first flip-flop having a setting input controlled by said pair of coincidence gates through a third coincidence gate, said first flip-flop further having a resetting input connected to said third output, said second flip-flop having data inputs respectively connected to set and reset outputs of said first input, said second flip-flop further having a switching input connected to said branch lead in parallel with a zero-setting input of said pulse-counting means.

10. A system as defined in claim 9, further comprising a differentiation circuit in said branch lead for shortening said driving pulses to produce said monitoring pulses.

* * * * *